(12) United States Patent
Fuehrer

(10) Patent No.: US 11,811,160 B2
(45) Date of Patent: Nov. 7, 2023

(54) PLUG CONTACT FOR AN ELECTRICAL CHARGING CONNECTOR

(71) Applicant: Phoenix Contact E-Mobility GmbH, Schieder-Schwalenberg (DE)

(72) Inventor: Thomas Fuehrer, Blomberg (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 0 days.

(21) Appl. No.: 17/913,183

(22) PCT Filed: Mar. 25, 2021

(86) PCT No.: PCT/EP2021/057693
§ 371 (c)(1),
(2) Date: Sep. 21, 2022

(87) PCT Pub. No.: WO2021/197998
PCT Pub. Date: Oct. 7, 2021

(65) Prior Publication Data
US 2023/0119572 A1    Apr. 20, 2023

(30) Foreign Application Priority Data
Mar. 31, 2020  (DE) ............... 10 2020 108 812.4

(51) Int. Cl.
*H01R 13/11*        (2006.01)
(52) U.S. Cl.
CPC ................... *H01R 13/11* (2013.01)
(58) Field of Classification Search
CPC ........ H01R 13/11; H01R 13/10; H01R 13/04; H01R 13/02; H01R 13/113; H01R 13/18; H01R 13/20; H01R 13/35; H01R 13/4223; H01R 13/4226
USPC ........................................... 439/465
See application file for complete search history.

(56) References Cited

U.S. PATENT DOCUMENTS

| | | | | |
|---|---|---|---|---|
| 8,858,264 | B2* | 10/2014 | Mott ...................... | H01R 13/42 439/660 |
| 8,876,562 | B2* | 11/2014 | Glick ................... | H01R 13/187 439/843 |
| 11,394,147 | B2* | 7/2022 | Mangstl ............... | H01R 13/052 |
| 11,437,761 | B2* | 9/2022 | Zhang ................. | H01R 13/504 |
| 2016/0197424 | A1 | 7/2016 | L Esperance et al. | |
| 2017/0054234 | A1 | 2/2017 | Kachlic | |
| 2019/0109397 | A1* | 4/2019 | Sugiura ................. | H01R 13/17 |
| 2019/0176653 | A1* | 6/2019 | Fuehrer .................. | B60L 53/16 |

(Continued)

FOREIGN PATENT DOCUMENTS

| | | |
|---|---|---|
| CN | 207116763 U | 3/2018 |
| CN | 109334485 A | 2/2019 |

(Continued)

*Primary Examiner* — Harshad C Patel
(74) *Attorney, Agent, or Firm* — LEYDIG, VOIT & MAYER, LTD.

(57) ABSTRACT

A plug contact for an electrical charging connector includes: a contact element having a contact area with at least one spring-loaded contact means, and a connection area for connecting an electrical conductor; a cooling element arranged at least in some areas around the contact area; and a heat-conducting element arranged between the cooling element and the contact element. The heat-conducting element is elastic and thermally and mechanically contacts the cooling element and the contact element.

13 Claims, 6 Drawing Sheets

(56) References Cited

U.S. PATENT DOCUMENTS

2019/0322186 A1* 10/2019 Arai .................. H01B 9/00
2023/0056363 A1*  2/2023 Fuehrer ............. H01R 13/111

FOREIGN PATENT DOCUMENTS

| CN | 209921090   U  | 1/2020  |
| DE | 202016008631 U1 | 9/2018  |
| DE | 102017222872 A1 | 6/2019  |
| DE | 102019110241 A1 | 10/2019 |

* cited by examiner

PLUG CONTACT FOR AN ELECTRICAL CHARGING CONNECTOR

CROSS-REFERENCE TO PRIOR APPLICATIONS

This application is a U.S. National Phase application under 35 U.S.C. § 371 of International Application No. PCT/EP2021/057693, filed on Mar. 25, 2021, and claims benefit to German Patent Application No. DE 10 2020 108 812.4, filed on Mar. 31, 2020. The International Application was published in German on Oct. 7, 2021 as WO/2021/197998 under PCT Article 21(2).

FIELD

The invention relates to a plug contact for an electrical charging connector. Furthermore, the invention relates to an electrical charging connector for charging an electric vehicle, having a plug contact described herein.

BACKGROUND

Such plug contacts can be used in electrical charging connectors for charging electric vehicles. For example, such charging connectors can be Type 2 plugs or plugs according to the Combined Charging System, CCS, which are based on a Type 2 plug and are expanded with two additional DC plug terminals. The plug variants according to the Combined Charging System are described in standard IEC 62196. Such plug types are used, for example, for charging ranges with a power of up to and above 240 kilowatts, or with a maximum current of 400 A and above for rapid charging with direct current.

The concept of electromobility is expanding to ever more demanding applications for which batteries with a capacity and size are used that differ significantly from those in passenger cars. Examples of such applications are vehicles in heavy goods traffic or in very highly powered vehicles, such as are used, for example, in mining. To make charging times possible within an acceptable range for electrically charging these vehicles, very high charging currents are required. Due to the expansion in electromobility into ever more and extensive areas, an even further increase in maximum charging currents is to be expected in the future. Due to the unavoidable ohmic losses, this leads to increasing thermal loads on the components concerned.

One example of critical components is the plug contacts on the charging connectors, since the high charging currents flow via the plug contacts. With increasing charging currents, the plug contacts are also exposed to increasing thermal loads. Ohmic losses of the plug contacts, as well as transition resistances at the plug contacts, generate heat which must be dissipated so that the components concerned are not damaged by the resulting heat.

In order to increase the performance of the plug contacts, it is known from the prior art to cool the plug contacts by means of a cooling fluid circuit. For example, DE 20 2016 008 631 U1 describes a plug contact which is connected to an electrical cable via a connection part. In the connection part there are cavities, into which cooling liquid flows and can thereby absorb and dissipate heat. Furthermore, CN 207116763 U describes a plug contact with a rigid opening for clamping a corresponding plug contact, wherein a cooling fluid flows around the area around the opening.

The plug contacts known from the prior art have the disadvantage that spring-loaded areas of the plug contacts, which serve to directly connect to a corresponding plug contact, are only insufficiently cooled.

SUMMARY

In an embodiment, the present invention provides a plug contact for an electrical charging connector, comprising: a contact element having a contact area with at least one spring-loaded contact means, and a connection area for connecting an electrical conductor; a cooling element arranged at least in some areas around the contact area; and a heat-conducting element arranged between the cooling element and the contact element, wherein the heat-conducting element is elastic and thermally and mechanically contacts the cooling element and the contact element.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1A:
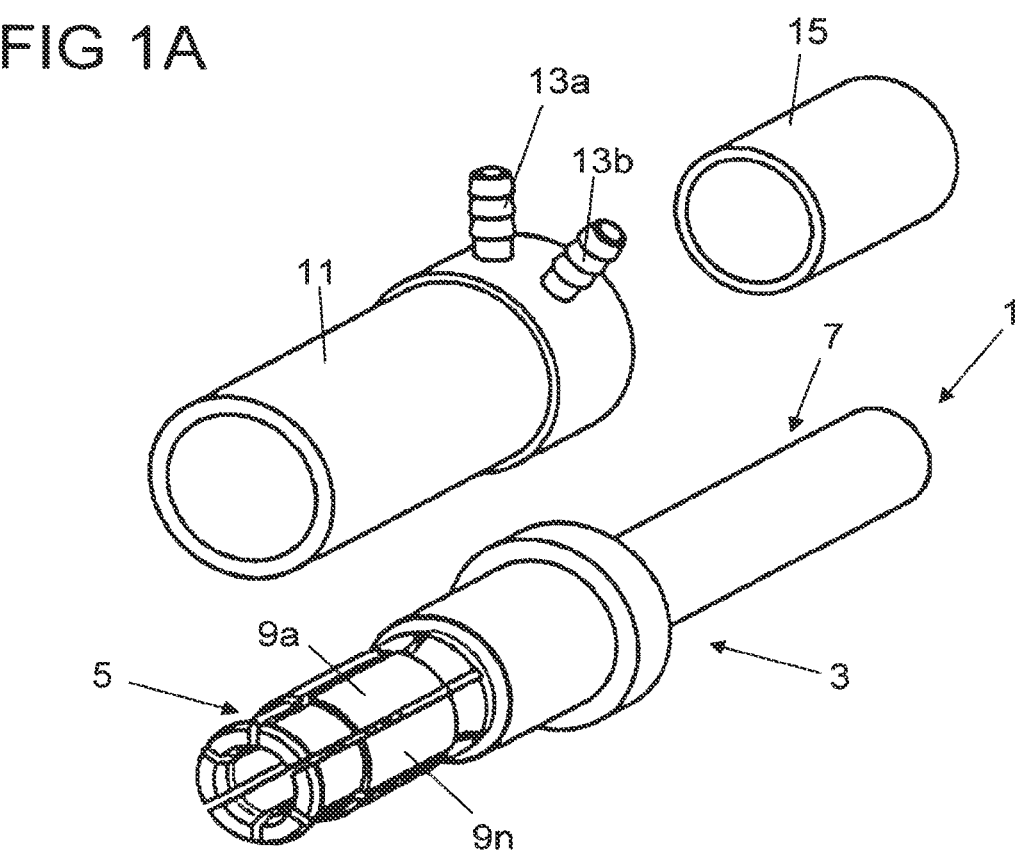
FIGS. 1A, 1B shows exploded views of a plug contact according to a first embodiment.

In an embodiment, the present invention provides a plug contact with improved cooling.

A plug contact for an electrical charging connector is accordingly provided, having:

a contact element having a contact area with at least one spring-loaded contact means, and a connection area for connecting an electrical conductor;

a cooling element arranged at least in some areas around the contact area; and a heat-conducting element arranged between the cooling element and the contact element, wherein the heat-conducting element is designed to be elastic and the cooling element and thermally and mechanically contacts the contact element.

The contact element can comprise, for example, an electrically conductive material, such as a copper material. An electrical conductor can be connected to the connection area at a first end of the contact element, for example via a clamping or threaded connection. At a second end opposite the first end, an area of a corresponding plug contact can be electrically contacted with the at least one spring-loaded contact means in order to establish an electrical connection. The term "spring-loaded contact means" may also be understood herein as a contact spring arm, for example as a contact spring arm of a socket contact. In one example, the spring-loaded contact means can be formed from a material which is electrically highly conductive or can be coated with such a material, such as, for example, a silver or gold alloy. The area on a corresponding plug contact, with for example a pin-shaped or tongue-shaped design, can be clamped between a plurality of contact spring arms and can thereby be mechanically and electrically contacted. For this purpose, when the corresponding plug contact is contacted, the contact springs can first be moved away from the corresponding plug contact and then rest with a spring force against the area of the corresponding plug contact.

The cooling element can be pushed over the contact element. The cooling element can also be flowed through by a cooling fluid at least in some areas. Alternatively or additionally, the cooling element can also comprise an electrothermal converter, for example a Peltier element, in order to dissipate heat from the contact area.

The term "heat-conducting element" can be understood herein as an element which can be arranged between the cooling element and the contact element. Depending on the design of the contact element and the cooling element, the heat-conducting element can also be designed differently, so that the heat-conducting element can be arranged in an area between the contact element and the cooling element and can fill this area. Furthermore, the heat-conducting element can comprise a thermally conductive material which can transport the heat at the contact element to the cooling element. In this respect, the thermally conductive material can be designed to be elastic in such a way that the spring-loaded contact element can travel a spring path radially outwards in the direction of the thermally conductive material when a corresponding plug contact, for example a pin contact or a flat contact, is inserted, without any significant increase in the plug-in normal force of the plug contact occurring.

Advantageously, due to the described structure of the plug contact, in addition to the axial transportation of heat from the contact area to the connection area of the contact element, heat from the contact area can also be released to the cooling element via the heat-conducting element. As a result, an improved cooling of the spring-loaded contact means is achieved and thus the current-carrying capacity of the plug contact can be improved.

In one example, the contact element is designed as a socket contact for holding an area of a corresponding plug contact which can be arranged in the contact area, in particular a pin contact or a flat contact.

For establishing an electrical connection, the socket contact can be connected to a corresponding pin contact or flat contact, for example. The connection area of the socket contact can be designed as a crimp connection. Alternatively, the connection area of the socket contact can also be designed as a screw terminal connection or be tin-plated.

In one example, the contact area has a plurality of spring-loaded contact means; in particular, the contact area has a plurality of contact lamellae.

Depending on the design of the socket contact for holding an area of a pin contact that can be arranged in the contact area or for holding a flat contact, the spring-loaded contact means can be arranged accordingly. For example, the spring-loaded contact means can be arranged in a ring for holding a round pin contact, or in one or more rows for holding a rectangular flat contact.

For example, the charging current can be transmitted via a plurality of lamellar segments. In this way, the transition resistance of the contact as a whole can advantageously be minimized, which results in a low power dissipation and thus a lower heat generation.

In one example, the cooling element and the heat-conducting element are sleeve-shaped.

The term "sleeve-shaped" can be understood herein to mean a design of the cooling element and of the heat-conducting element as round, internally hollow and elongated elements. For example, the sleeve-shaped cooling element can be pushed over the contact element and the sleeve-shaped heat-conducting element can be arranged between the sleeve-shaped cooling element and the contact area of the contact element.

In one example, the cooling element and the heat-conducting element are arranged coaxially around the contact area of the contact element.

The heat can advantageously be dissipated uniformly from the contact area by a coaxial arrangement of the cooling element around the contact area.

In one example, the cooling element and/or the heat-conducting element are rectangular.

For example, the rectangular cooling element and the rectangular heat-conducting element can be used in a box-shaped socket contact for holding a rectangular flat contact. The heat-conducting element can also be designed in several parts, for example formed from a plurality of plates, which can be arranged between the cooling element and the contact area at least in some areas.

In one example, the cooling element comprises at least one channel in a material of the cooling element, for a cooling fluid to flow through.

The term "channel" can be understood herein as a line, recess, opening and/or hole in the material of the cooling element through which a cooling fluid, for example a cooling liquid or a gas, can flow. In examples, the channel can comprise a channel system with a plurality of branches and can run in a spiral and/or parallel manner with uniform or different dimensions over the course of the channel, in order to be able to cool the contact area of the contact element efficiently depending on the specific embodiment. In one example, the cooling element may comprise a thermally conductive material such as a metal or a thermally conductive plastic.

In one example, the cooling element comprises at least two channel connections.

In the cooling element, openings can be introduced at the end regions of the channel in order to convey the cooling fluid through the channel. For example, the channel connections can be formed by nozzles on the end regions. The nozzles can, for example, have a flange, onto which the tubes conveying the cooling fluid can be plugged and held. In examples, a pump can pump the cooling fluid through the channel. In examples, the cooling element can also have more than two channel connections if, for example, different cooling circuits are realized in the cooling element. The cooling connections can also be arranged axially next to one another along the extension direction of the cooling element, or can be arranged on the cooling element radially apart from one another.

In one example, the cooling element is of double-walled design and the channel runs between an inner wall and an outer wall of the cooling element.

For example, an intermediate space can be arranged in the material of the cooling element as a channel between the outer surfaces of the cooling element in order to utilize the largest possible areas of the outer surfaces for the cooling.

In one example, the cooling element is designed in several parts.

For example, the cooling element can be formed from two or more parts and the individual parts can be manufactured from different materials. Advantageously, a modular cooling element can thus be realized which can be assembled individually for a contact element depending on the desired field of application.

In one example, the cooling element comprises a first heat sink at least in some areas around the contact area, wherein the first heat sink comprises a solid material, and a second heat sink having the channel for the cooling fluid to flow through, wherein the second heat sink is in thermal contact with the first heat sink.

For example, in the second area of the heat sink the channel can run around the connection area in order to cool it efficiently and the contact area can be cooled by means of the first heat sink.

In one example, the heat-conducting element comprises a ceramic-filled plastic material, a woven fabric made of metal wires or a non-woven made of metal wires.

Advantageously, these materials have a high thermal conductivity and good elastic properties. The ceramic-filled plastic material can, for example, be a composite material based on a polymer filled with ceramic. Such a material can be easily shaped and thus be precisely fitted into the area between the contact element and the cooling element. Furthermore, the ceramic introduced in the plastic material extends the diffusion path of liquids, which in turn additionally protects the contact area.

The invention also relates to an electrical charging connector for charging an electric vehicle, having at least one plug contact described herein.

In further examples, the electrical charging connector can have the features described with regard to the plug contact.

FIG. 1A shows a view of a plug contact 1 according to a first embodiment. An exploded view of the plug contact 1 is shown, in which the individual parts shown are shown essentially spatially separated from one another.

The plug contact 1 shown comprises a contact element 3 with a contact area 5 and a connection area 7. In the embodiment shown, the contact element 3 comprises an electrically conductive material and can be connected to an electrical conductor at the connection area 7. Contact lamellae are arranged as spring-loaded contact means 9a-9n on the contact area 5, which is opposite the connection area 7 in the embodiment shown. A corresponding pin contact can be inserted into the opening formed by the circular arrangement of the spring-loaded contact means 9a-9n. When the corresponding pin contact is inserted, the spring-loaded contact means 9a-9n are first moved away from the opening and the corresponding pin contact and then press with their spring force against the corresponding pin contact and thus fasten the corresponding pin contact mechanically. At the same time, the spring-loaded contact means 9a-9n electrically contact the corresponding pin contact.

Furthermore, FIG. 1A shows a cooling element 11 which can be arranged around the contact area 5 of the contact element 3. The cooling element 11 shown in FIG. 1A is sleeve-shaped and is therefore shown as a round, internally hollow and elongated element. A channel, which is shown in more detail in the sectional views shown in FIGS. 3A and 3B, runs within the material of the cooling element 11. In the embodiment shown, there are two channel connections 13a, 13b which are connected to the channel and can be plugged onto the tubes that convey the cooling fluid. For example, a pump can pump the cooling fluid through the channel.

Figure 2:
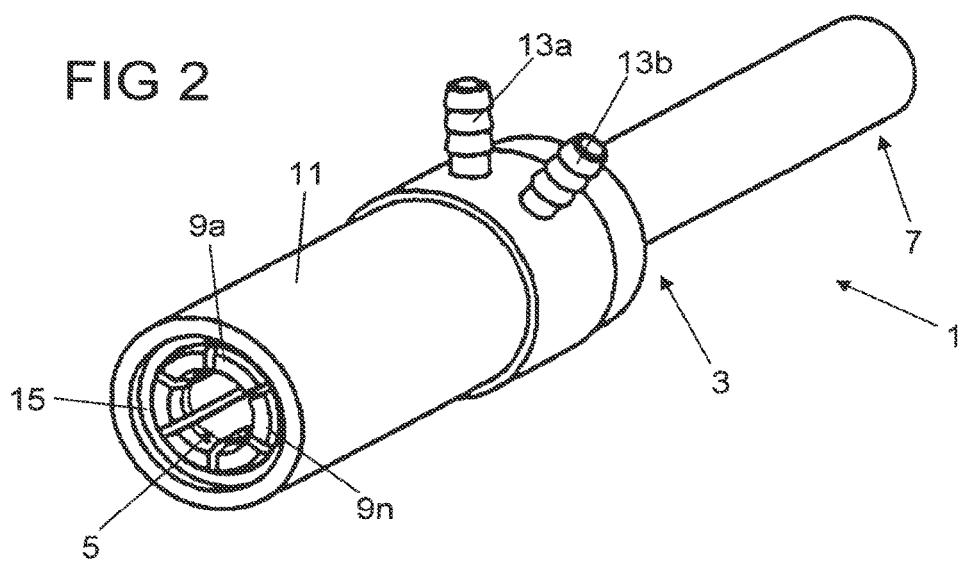
FIG. 2 is a representation of a plug contact according to the first embodiment in an assembled state.

FIG. 1A also shows a heat-conducting element 15 which, in the assembled state, as shown in FIG. 2, is arranged between the cooling element 11 and the contact element 3 and thermally and mechanically contacts an inner side of the cooling element 11 and an outer side of the contact element 3. In FIG. 1A, the heat-conducting element 15 is shown as a ceramic-filled plastic material, which is designed in the shape of a sleeve.

Figure 1B:
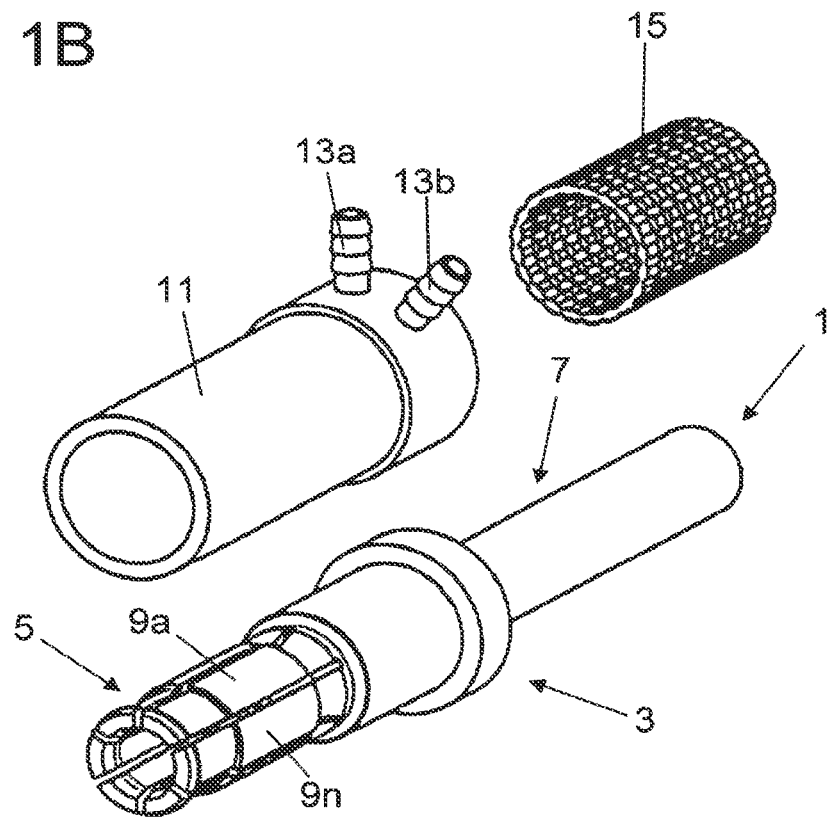

FIG. 1B shows a further view of the plug contact 1 according to the first embodiment. The contact element 3 shown and the cooling element 11 are the elements already shown in FIG. 1A. The heat-conducting element 15, on the other hand, is shown in FIG. 1B as a woven fabric or non-woven made of metal wires.

FIG. 2 shows a representation of a plug contact 1 according to the first embodiment in an assembled state. The heat-conducting element 15 shown can be the heat-conducting element 15 shown in FIG. 1A or FIG. 1B. As shown in FIG. 2, the heat-conducting element 15 is arranged between the cooling element 11 and the contact element 2 and, in the embodiment shown, surrounds the contact area 5 with the spring-loaded contact means 9a-9n.

When the corresponding pin contact is inserted, the spring-loaded contact means 9a-9n can travel a spring path radially outwards in the direction of the heat-conducting element 15, and the heat-conducting element 15 can be displaced at least in some areas due to the elastic design of the heat-conducting element 15, without a significant increase in the plug-in normal force of the plug contact 1 occurring.

Figure 3A:
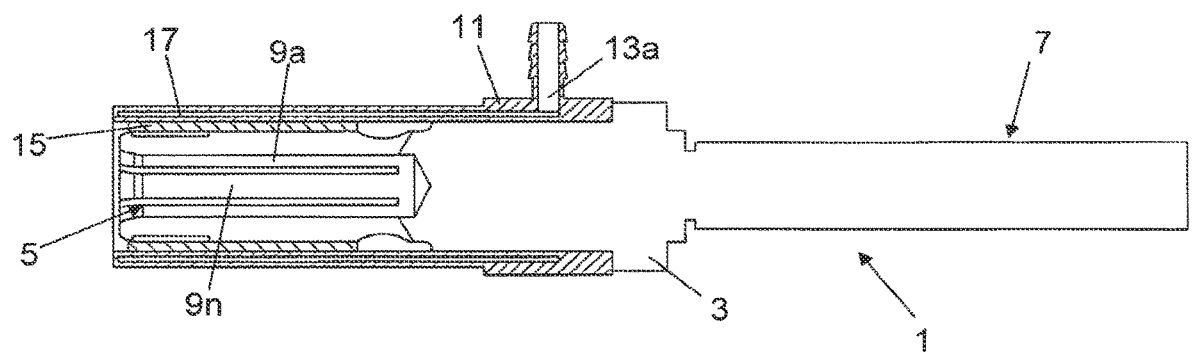
FIG. 3A, 3B shows sectional views of a plug contact according to the first embodiment.
Figure 3B:
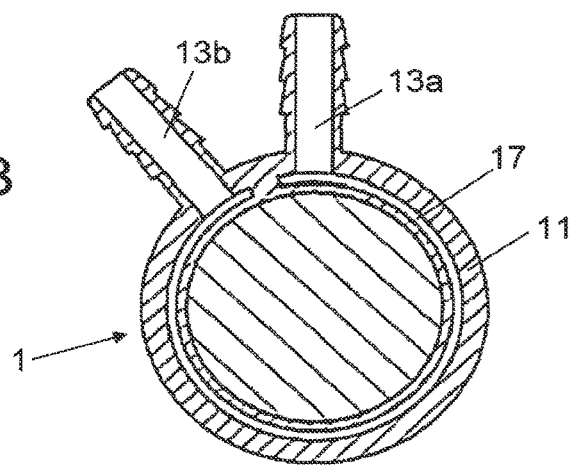

FIGS. 3A and 3B show sectional views of a plug contact 1 according to the first embodiment. The plug contact 1 shown is the plug contact 1 previously shown in FIG. 2.

FIG. 3A shows a section through the plug contact 1 along a longitudinal axis of the plug contact 1. FIG. 3B shows a section through the plug contact 1 at a right angle to the longitudinal axis of the plug contact 1 at the level of the channel connections 13a, 13b.

In the embodiment shown in FIGS. 3A and 3B, the cooling element 11 is of double-walled design and the channel 17 runs between an inner wall and an outer wall in the material of the cooling element 11.

For example, an intermediate space can be arranged in the material of the cooling element 11 as a channel 17 between the outer surfaces of the cooling element 11 in order to be able to utilize the largest possible areas of the outer surfaces for the cooling.

Figure 4A:
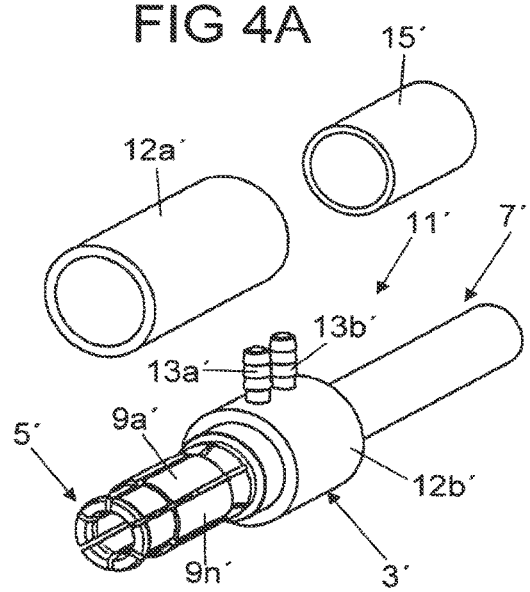
FIGS. 4A, 4B shows exploded views of a plug contact according to a second embodiment.
Figure 4B:
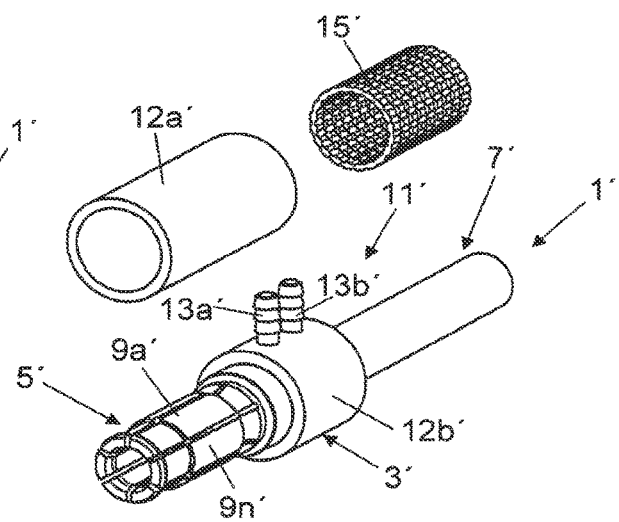

FIGS. 4A and 4B show exploded views of a plug contact 1' according to a second embodiment.

The contact elements 3' and heat-conducting elements 15' shown in FIGS. 4A and 4B can be the contact elements and heat-conducting elements already shown above with regard to the first embodiment. In FIG. 4A, the heat-conducting element 15' is shown as a ceramic-filled plastic material which is sleeve-shaped and in FIG. 4B the heat-conducting element 15' is shown as a woven fabric or a non-woven made of metal wires.

In the second embodiment shown, the cooling element 11' is designed in two parts. As shown, a first heat sink 12a' is arranged at least in some areas around the contact area 5', wherein the first heat sink 12a' comprises a solid material. A second heat sink 12b', having the channel for the cooling fluid to flow through and the two channel connections 13a', 13b', which are connected to the channel and plugged onto the tubes, can be arranged directly on the contact element 3' between the contact area 5' and the connection area 7'. In embodiments, the second heat sink 12b' can be plugged onto the contact element 3' or be formed integrally with the contact element 3'.

Figure 5:
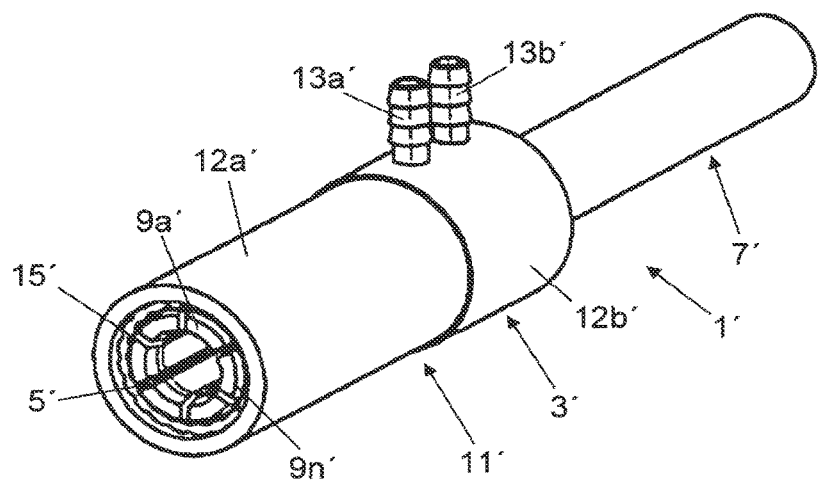
FIG. 5 is a representation of a plug contact according to the second embodiment in an assembled state.

FIG. 5 shows a representation of a plug contact 1' according to the second embodiment in an assembled state. The heat-conducting element 15' shown can be the heat-conducting element 15' shown in FIG. 4A or FIG. 4B. As shown in FIG. 5, the first and second cooling elements 12a', 12b' of the two-part cooling element 11' touch each other in the assembled state and thus establish the thermal contact.

Figure 6:
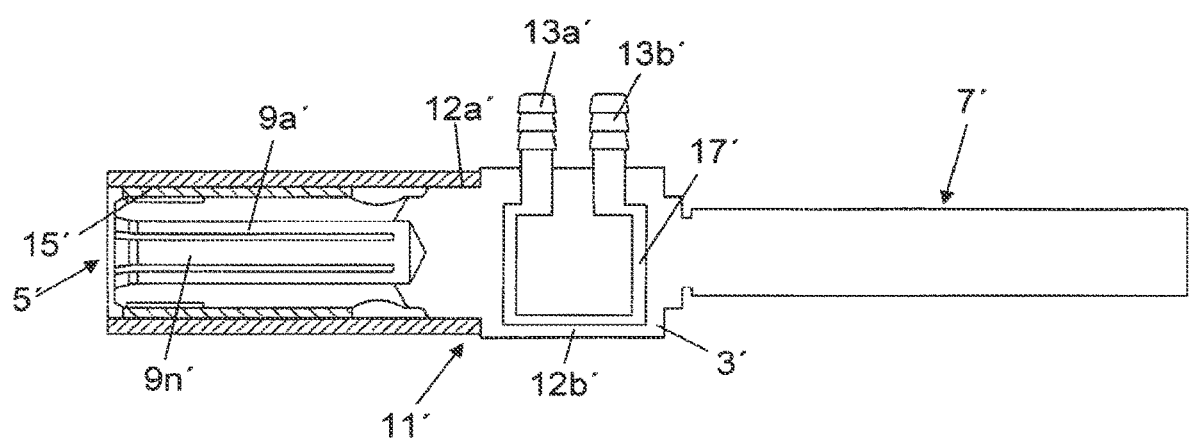
FIG. 6 shows a sectional view of a plug contact according to the second embodiment.

FIG. 6 shows a sectional view of a plug contact 1' according to the second embodiment. In contrast to the sectional views of the first embodiment shown previously in FIGS. 3A and 3B, in the first heat sink 12a' of the cooling element 11' there is no channel surrounding the contact area 5'. Instead, the first heat sink 12a' comprises a solid material and the second heat sink 12b' comprises the channel and is in thermal contact with the first heat sink 12a'.

Figure 7A:
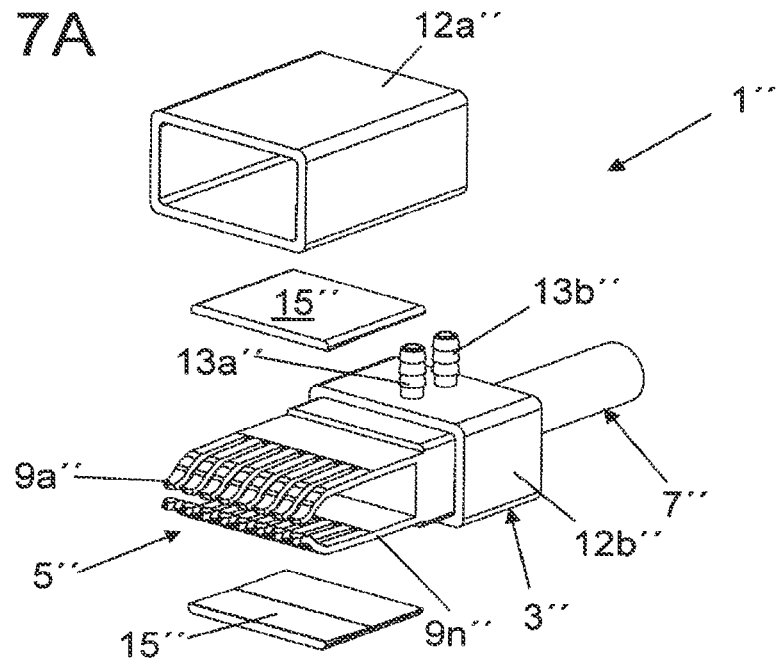
FIGS. 7A-7C are representations of a plug contact according to a third embodiment.
Figure 7B:
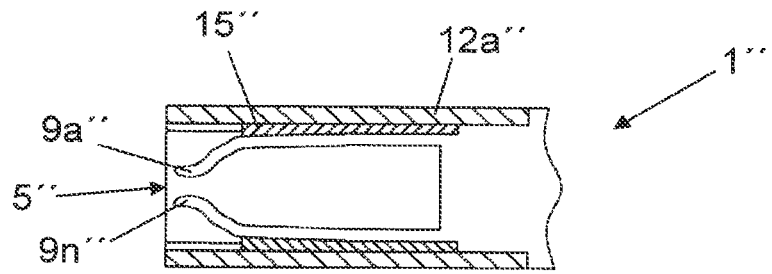
Figure 7C:
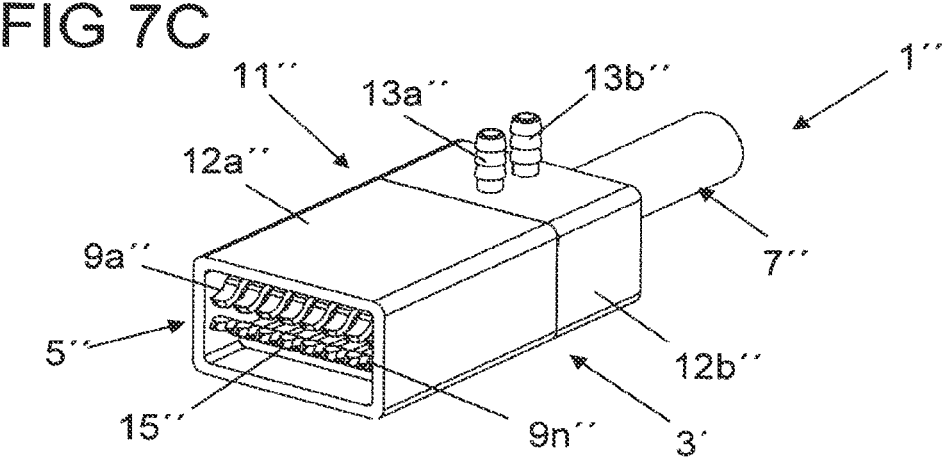

FIGS. 7A-7C show representations of a plug contact 1" according to a third embodiment.

FIG. 7A shows an exploded view of the plug contact 1" according to the third embodiment. The plug contact 1" shown differs from the previously shown plug contacts of the first and second embodiments in that the spring-loaded contact means 9a"-9n" for holding a corresponding flat contact are arranged in the contact area 5" in two rows. In the embodiment shown in FIGS. 7A-7C, the cooling element 11" is rectangular and the heat-conducting element 15" is designed in two parts in order to be able to be arranged in the contact area 5" on the spring-loaded contact means 9a"-9n" that are arranged in two rows. In further embodiments, the heat-conducting element can also have side walls.

FIG. 7B shows a section through the contact area 5" along a longitudinal axis of the plug contact 1". FIG. 7C shows a representation of the plug contact 1" according to the third embodiment in an assembled state.

Figure 8:
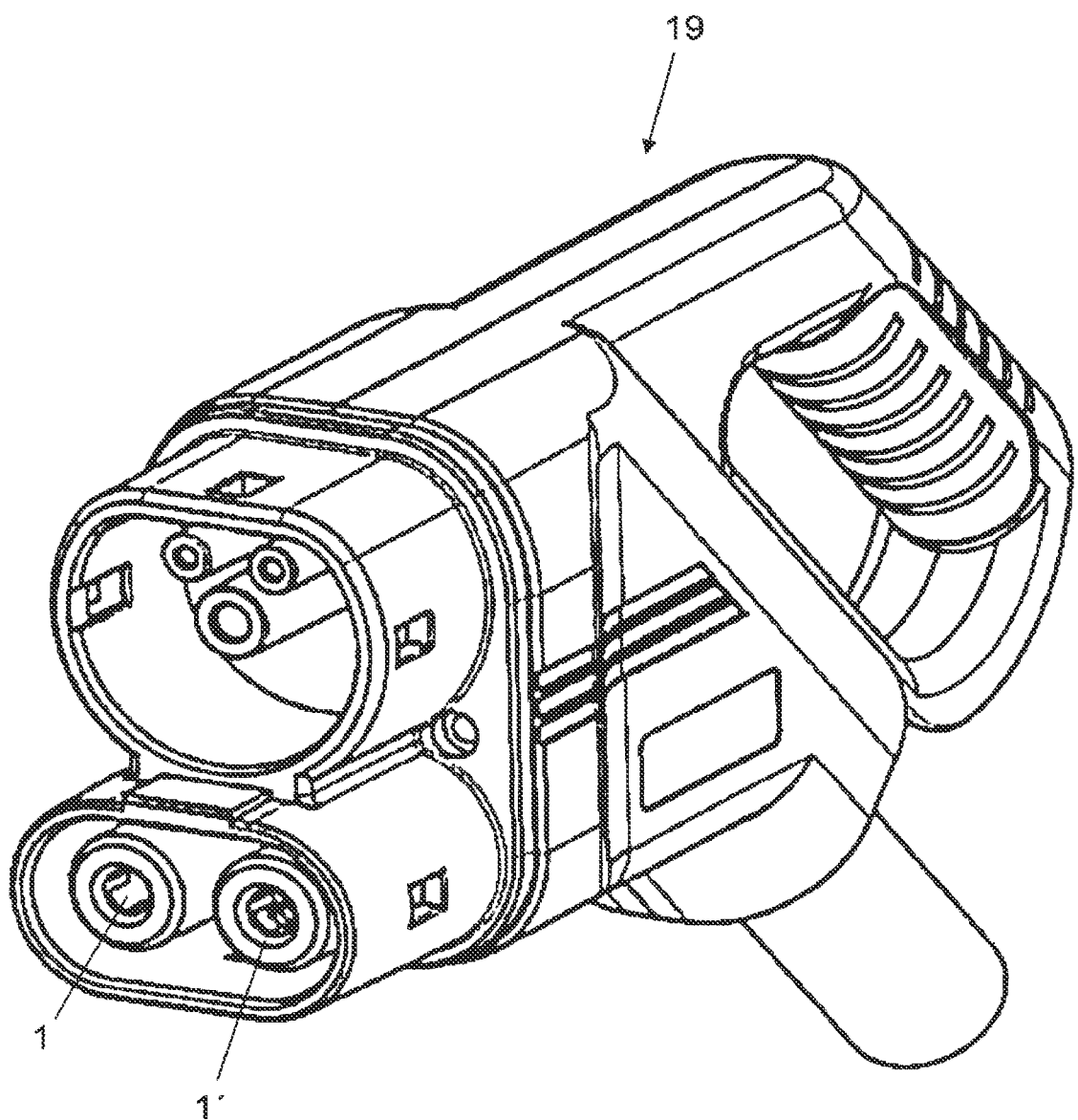
FIG. 8 shows a view of a charging connector according to one embodiment.

FIG. 8 shows a view of a charging connector 19 according to one embodiment. FIG. 8 shows, by way of example, the charging connector 19 as a charging connector of the Combined Charging System, CCS, Type 2. In the charging connector 19 shown, the two DC contacts are shown by way of example as plug contacts 1, 1' according to the first and second embodiments.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1, 1', 1" Plug contact
3, 3', 3" Contact element
5, 5', 5" Contact area
7, 7', 7" Connection area
9a-9n, 9a'-9n', 9a"-9n" Spring-loaded contact means
11, 11', 11" Cooling element
12a', 12a", 12b', 12b" First, second heat sink
13a, 13a', 13a", 13b, 13b', 13b" Channel connection
15, 15', 15" Heat-conducting element
17, 17' Channel
19 Charging connector

The invention claimed is:

1. A plug contact for an electrical charging connector, comprising:
 a contact element having a contact area with at least one spring-loaded contact means, and a connection area for connecting an electrical conductor;
 a cooling element arranged at least partially around the contact area; and
 a heat-conducting element arranged between the cooling element and the contact element,
 wherein the heat-conducting element is elastic and thermally and mechanically contacts the cooling element and the contact element.

2. The plug contact of claim 1, wherein the contact element comprises a socket contact for holding an area of a corresponding plug contact which is arrangeable in the contact area, the socket contact comprising a pin contact or a flat contact.

3. The plug contact of claim 2, wherein the contact area has a plurality of spring-loaded contact means comprising contact lamellae.

4. The plug contact claim 1, wherein the cooling element and the heat-conducting element are sleeve-shaped.

5. The plug contact of claim 4, wherein the cooling element and the heat-conducting element are arranged coaxially around the contact area of the contact element.

6. The plug contact of claim 1, wherein the cooling element and/or the heat-conducting element are rectangular.

7. The plug contact claim 1, wherein the cooling element comprises at least one channel in a material of the cooling element for a cooling fluid to flow through.

8. The plug contact of claim 7, wherein the cooling element comprises at least two channel connections.

9. The plug contact of claim 7, wherein the cooling element is double-walled and the channel runs between an inner wall and an outer wall of the cooling element.

10. The plug contact claim 7, wherein the cooling element comprises a plurality of parts.

11. The plug contact of claim 10, wherein the cooling element comprises a first heat sink, arranged at least partially around the contact area,
 wherein the first heat sink comprises a solid material, and comprises a second heat sink having the channel for the cooling fluid to flow through, and
 wherein the second heat sink is in thermal contact with the first heat sink.

12. The plug contact claim 1, wherein the heat-conducting element comprises a ceramic-filled plastic material, a fabric comprising metal wires, or a non-woven comprising metal wires.

13. An electrical charging connector for charging an electric vehicle, comprising:
   at least one plug contact of claim 1.

\* \* \* \* \*